United States Patent [19]

Ahuja

[11] 4,350,849

[45] Sep. 21, 1982

[54] VARYING IMPEDANCE LINE TEST TERMINATION DEVICE

[75] Inventor: Omprakash G. Ahuja, East Meadow, N.Y.

[73] Assignee: TII Industries Inc., Copiague, N.Y.

[21] Appl. No.: 224,914

[22] Filed: Jan. 15, 1981

[51] Int. Cl.³ .......................... H04M 3/22; H04B 3/46
[52] U.S. Cl. ............................... 179/175; 179/175.3 R
[58] Field of Search .......... 179/175, 175.3 R, 175.1 R, 179/84 L, 175.2 B, 175.24, 175.25, 81 C; 324/51, 52, 53

[56] References Cited

U.S. PATENT DOCUMENTS 3,469,036  9/1969  Meri ................................. 179/84 L
3,941,950  3/1976  Dunwoodie et al. ......... 179/175.3 R
3,951,248  4/1976  Feiner et al. ......................... 179/175

Primary Examiner—Thomas A. Robinson
Attorney, Agent, or Firm—Martin Sachs

[57] ABSTRACT

A varying impedance line test termination device for providing a characteristic signature to the telephone central office when a continuity test is made on a subscriber line having a pair of electrically conductive paths includes a first current path having a first resistor and a capacitor connected in series across the electrically conductive line paths and a second current path having a diode and a voltage breakover device connected in series across the capacitor. If the voltage breakover device is capable of emitting light, a flashing indication will be provided when the subscriber line is being interrogated.

11 Claims, 10 Drawing Figures

VARYING IMPEDANCE LINE TEST TERMINATION DEVICE

BACKGROUND OF THE INVENTION

1. Field of the Invention

The present invention relates to telephone line test termination devices and, in particular, to a circuit arrangement which provides a unique or characteristic signature to the central office when a continuity test is made on a subscriber line.

2. Discussion of the Relevant Art

Many different types of circuit arrangements have been suggested for use in testing telephone subscriber lines from a remote location. Generally, these circuit arrangements require installation and the appearance of a telephone installer who must physically visit the premises where the telephone is installed and then signal the central office so that the central office operator may perform the required tests to determine if the subscriber lines are in working order. Many of these circuit arrangements include a switching device and a tuned circuit which is activated from the central office. These components are unreliable and require an installer to enter the home where the telephone is located. This is unsatisfactory for numerous reasons. Generally, the devices known to the applicant are unable to remain permanently at the installed telephone, or if they are capable of being installed permanently, they require activation by an AC signal provided by the central office. This approach to the problem is unreliable and therefore, unsatisfactory. A simple reliable means of providing a characteristic signature or varying impedance across the subscriber conducting paths which can provide an indication at the central office that the subscriber line is intact and operable by merely utilizing a DC test voltage and a reversing switch has not been disclosed heretofore.

SUMMARY OF THE INVENTION

The present invention overcomes the shortcomings of the prior art by providing a simple, inexpensive circuit arrangement which may be installed permanently at the subscriber's telephone or station protector, be installed by the use of a removable plug, or may be provided with the installation of new telephone equipment by providing a circuit arrangement in the instrument and/or its associated plug.

Therefore, it is an object of the present invention to provide a simple, inexpensive circuit arrangement that may be connected across a subscriber line to yield a characteristic signature or varying impedance which may be readily recognized by a central office interrogating the line during a continuity test.

Another object of the present invention is to provide a subscriber termination device which has a characteristic signature that may be left across the subscriber line at all times.

It is yet another object of the present invention to provide a reliable termination device for telephone subscriber lines that will yield a characteristic signature and also provide a visual indication when the line is being interrogated by the central office.

A varying impedance line test device for providing a characteristic signature to the telephone central office when a continuity test is made on a subscriber line having a pair of electrically conductive paths comprises a first current path having a first resistor and a capacitor connected in series. The serially connected resistor and capacitor are connected across the electrically conductive line paths. A second current path has a diode and a voltage breakover device connected in series and is connected across the capacitor.

The foregoing and other objects and advantages will appear from the description to follow. In the description reference is made to the accompanying drawing which forms a part hereof, and in which is shown by way of illustration a number of specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
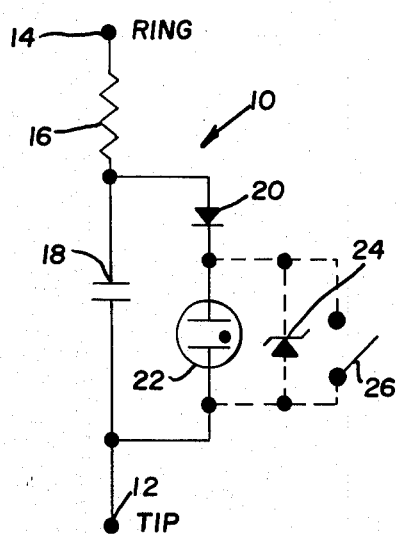
FIG. 1 is a schematic circuit diagram of one embodiment according to the principles of the present invention.
Figure 5:
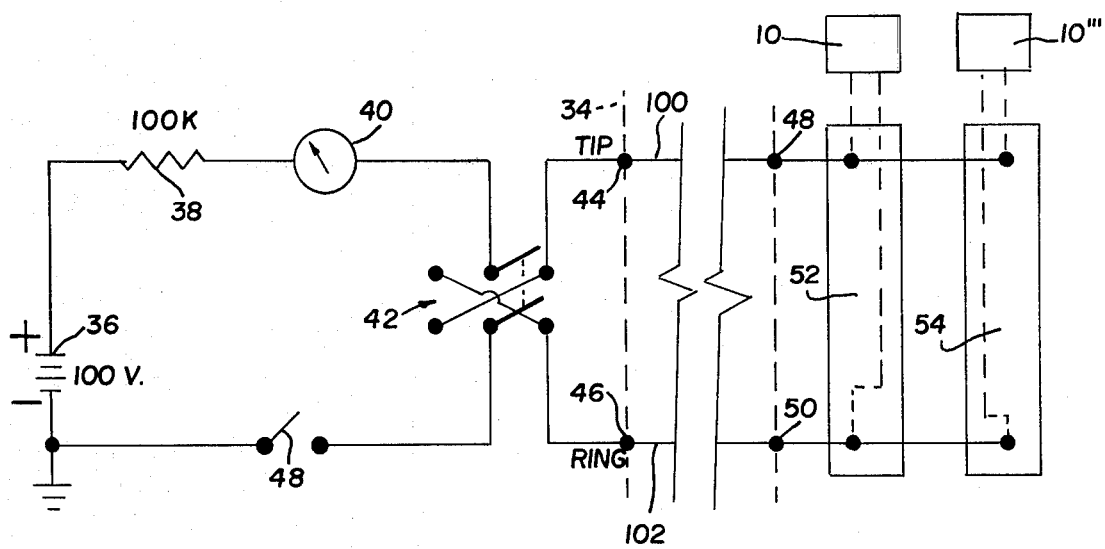
FIG. 5 is a schematic circuit and functional block diagram of the continuity test performed by the central telephone office on a subscriber line.

Referring now to the figures, and in particular, to FIG. 1, there is shown one embodiment 10 of a varying impedance line test termination circuit arrangement, which may be connected across a subscriber line having a pair of electrically conductive paths 100 and 102, as shown in FIG. 5. The tip terminal of FIG. 1 is connected to one of the conductive paths (100 in FIG. 5) while the ring terminal 14 is connected to the other conductive path 102 (shown in FIG. 5) of the subscriber line providing a first current path therebetween that includes a resistor 16 connected in series with a capacitor 18. A diode 20 connected in series with a voltage breakover device 22, which may be a neon tube, forms a second current path and is connected across or parallel with capacitor 18. Voltage breakover device 22, preferably, is a neon bulb, but may be a zener diode 24 having its cathode electrode connected to the cathode electrode of diode 20 with the anode electrode of the diode 20 and the zener diode 24 being connected to opposite ends of capacitor 18. The circuit arrangement as shown in FIG. 1 may be connected across a conventional voltage arrester, not shown, or installed across any other device placed across the subscriber line as shown in FIG. 5. Ideally a solid state switch 26 is preferred for the component 22.

For a more detailed discussion as to the housings that may be utilized for the varying impedance line test termination circuit arrangement reference may be made to FIGS. 8, 9 and 10 which will be discussed hereinafter.

In operation, a DC voltage is applied across terminals 12 and 14 by the central office test operator when he interrogates the subscriber line to determine its continuity. The operation of this test and interrogation circuitry will be explained in conjunction with FIG. 5. However, it is to be noted that a positive voltage appearing on terminal 12 with respect to terminal 14 will cause the capacitor 18 to charge exponentially to the DC voltage applied across the terminals and thus, no other current will flow between the terminals 12 and 14 thereafter. When terminal 14 is positive with respect to terminal 12 the current flowing in the first current path through resistor 16 will cause capacitor 18 to charge exponentially in a conventional manner, until the voltage across capacitor 18 exceeds the breakover voltage of the voltage breakover device 22, which is shown preferably as a neon bulb. As the neon bulb breaks over (arcs) capacitor 18 will be discharged therethrough until the quench voltage is reached turning off the neon bulb and thus permitting the capacitor to charge to the breakover voltage of the neon bulb 22 again. This action will be repeated as long as the DC voltage (plus being on terminal 14 with respect to terminal 12) is permitted to exist. Thus, the amount of current being drawn through the conductive paths 100 and 102 (subscriber line) will vary in accordance with the charging of capacitor 18 presenting a variable impedance across the subscriber line. Ideally for the maximum deflection or change in current flow in the subscriber line it will be desirable to provide an activated solid state switch 26 in place of the neon tube or zener diode 24, thereby permitting the voltage to decrease to zero across the breakover device when it breaks down. Thus, in general this action will provide a clearly discernible indication by the operator interrogating the subscriber line and will clearly indicate that the line is intact up until the line test termination device.

Figure 2:
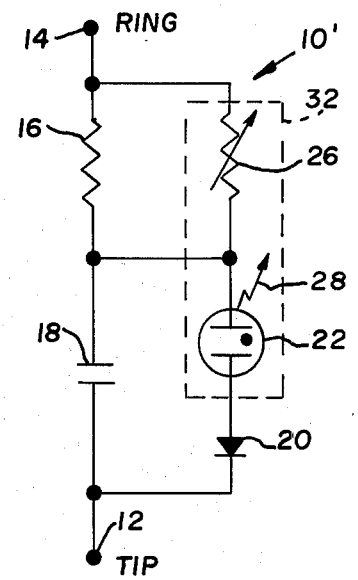
FIG. 2 is a schematic circuit diagram of another embodiment of the instant invention.

Refer now to the embodiment disclosed in FIG. 2 which discloses a similar arrangement of components. It is to be noted that like components have been given identical numerical designations. A light dependent resistor (LDR) 26 is connected in parallel with resistor 16 and is placed in close proximity to the voltage breakover device 22, which preferably is a neon tube. Thus, light rays 28 emanating from the neon tube will cause the light dependent resistor to change from a relatively high resistance value to a relatively low resistance value and revert back to a high resistance value when the neon bulb is extinguished. The position of diode 20 with respect to voltage breakover device 22 is not critical as long as it is in series therewith and forms a second current path around capacitor 18. Here again, the operation of the circuit arrangement in FIG. 2 is similar to that of FIG. 1. No current will flow between terminals 12 and 14, in steady state conditions, when a plus voltage is applied to terminal 12 relative to terminal 14 because of the blocking capability (prohibiting reverse current flow) of diode 20. The arrangement of FIG. 2 permits a greater change in impedance (permits more current to flow in the line) when the voltage breakover device 22 breaks down, thereby giving a greater change in current swing which may be more readily observed by the central office test operator when interrogating a subscriber line.

Figure 3:
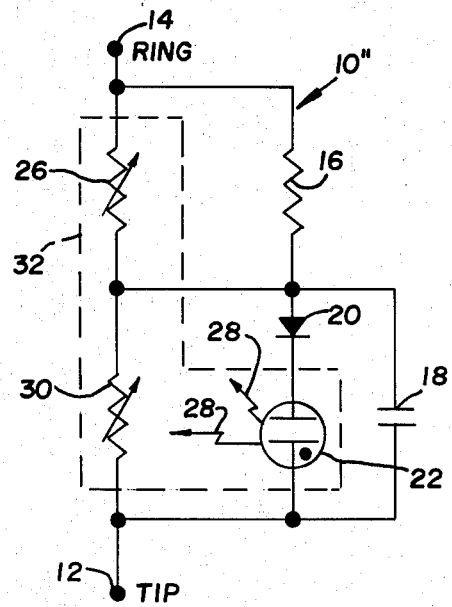
FIG. 3 is a schematic circuit diagram of yet another embodiment of the instant invention.

The circuit arrangement disclosed in FIG. 3 shows yet another embodiment of the instant invention and has incorporated the addition of a light dependent resistor 26 connected across resistor 16 and an additional light dependent resistor 30 connected across capacitor 18. Light dependent resistors 26 and 30 may be two independent resistors or a single light dependent resistor with a center tap connected as shown. Here again, the light emitting breakover device 22 is placed in close proximity with resistors 26 and 30 as indicated by the dotted line 32 which may take the form of an independent housing assembly. Here again, the circuit arrangement set forth in FIG. 3 provides for an increase in current variations (varying impedance) as the voltage breakover device 22 turns on and off. As the light rays 28 emanate from the breakover device 22 they cause the light dependent resistors 26 and 30 to change from a normal high resistance value to a relatively low resistance value. A central office test operator when interrogating a subscriber line having this circuit arrangement connected thereacross will readily be able to determine and recognize the characteristic signature as the 100 volts DC test voltage is placed across terminals 12 and 14. With a positive voltage on terminal 12 with respect to terminal 14 relatively little current will flow and with the positive voltage on terminal 14 with respect to terminal 12 the characteristic variable impedance will be indicated on the central office test meter as will be explained hereinafter.

Figure 4:
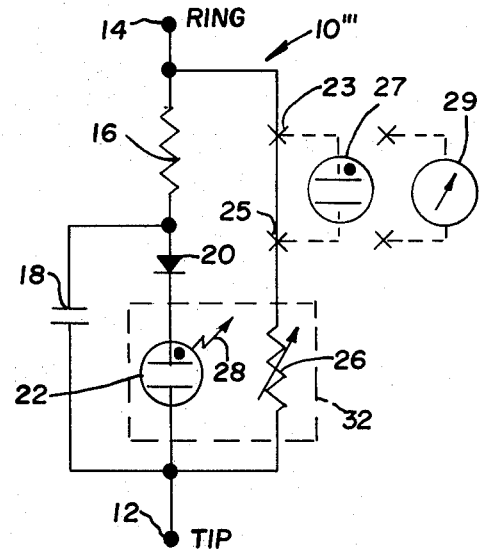
FIG. 4 is a schematic circuit diagram of still another embodiment of the instant invention.

Refer now to FIG. 4, which shows yet another embodiment of the instant invention. A first current path between terminals 12 and 14 is provided by the series connection of resistor 16 and capacitor 18. Across capacitor 18 a second current path is provided consisting of the series connection of diode 20 and voltage breakover device 22. An additional light dependent resistor 26 is connected in parallel with the first current path consisting of resistor 16 and capacitor 18. Resistor 26 is disposed in close proximity to the light emitting breakover device 22. When the light rays 28 emanating from the light emitting breakover device 22 reach light dependent resistor 26, it changes from a relatively high resistance state to a relatively low resistance state, thereby changing the current drawn from the central office when the subscriber line is being interrogated. Once the light emitting breakover device 22 extinguishes because the capacitor 18 discharges, it turns off, as explained hereinbefore, causing the resistor to change its state. This will repeat as long as the positive test voltage appears on terminal 14 with respect to terminal 12 and will provide a characteristic signature as mentioned earlier.

The path connecting resistor 26 between terminals 12 and 14 may be broken, for example, at points 23 and 25 and a light emitting device 27, such as a neon bulb and/or a light emitting diode may be inserted therein and/or a miniaturized meter 29 may be placed in the same position. Thus, the housing assembly containing light emitting diode breakover device 22 and the light dependent resistor 26 may be sealed to prevent any external light rays from radiating therein, while the light rays emanating from the light emitting device 27 may be used to give the visual indication of the varying current flowing therethrough. In the case wherein the meter 29 is utilized in lieu of or with a light emitting device 27, a visual indication is obtained by the rapid movement of the meter indicator (needle) as the current in the second current path varies. Inserting a light emitting diode 27 and/or a meter 29 into the circuit as indicated in FIG. 4 will not affect the circuit functioning as described earlier.

FIG. 5 discloses a test circuit arrangement utilized by the telephone central office to interrogate a subscriber line in order to determine if the line is in operating order and is not shorted to ground or each other or broken somewhere between the central office and the subscriber's home. All the items shown to the left of broken line 34 are generally located at the telephone central office at the test station and include a DC voltage source 36 (approximately 100 volts) which has a series current limiting resistor 38 of approximately 100,000 ohms connected in series with a milli-ammeter 40 and a polarity reversing voltage switch 42 connected to terminals 44 and 46, and a switch 48 which is also included to complete the test circuit path. The subscriber telephone lines 100 and 102 are connected to terminals 44 and 46, resepectively, at the central office and are connected to terminals 48 and 50, respectively, at the subscriber's end where the telephone instruments 52 and 54 are to be installed. Any number of telephone instruments may be connected in parallel in a conventional manner. Each of the telephone instrument terminations may include a variable impedance line test termination device 10—10''' connected across the instrument conductive wires as shown herein, thereby providing the characteristic signature as described hereinbefore. The line test termination device 10 may be incorporated in a housing which may be readily installed into a receptacle presently in use by the telephone company. The housing may also provide a means for accepting a telephone hand-set plug so that it may be left in position permanently.

With the present utilization of telephone plugs and jacks by the telephone companies, the instant invention is ideally suited for use therewith as explained hereinbefore. Since the telephone subscriber is permitted to install his own telephone instrument, the telephone line must be checked by the central office in order to determine its suitability for use. These tests, which are made by the central office test desk, determine if the subscriber line is open, shorted, grounded or has a foreign battery on it. Without a telephone set and its associated ringer connected to the line, the test for continuity (open circuit) cannot be reliably made unless telephone personnel are dispatched to the consumer's location to assist in performing the test. With the instant invention, this shortcoming is overcome. The central office may now check the subscriber line up to the point where a variable impedance line test termination device has been installed. The central office test desk makes the loop continuity test by accessing the subscriber line in the conventional manner and operates the ground key (switch 48) on the test board. This applies 100 volts DC in series with 100 kΩ resistor (38) through the tip side of the subscriber's line and provides ground to the ring side of the line. By operating the reverse key or switch 42, these connections are changed so that the voltage is applied to the ring side of the subscriber line and the ground is applied to the tip side of the subscriber line.

A good subscriber line without a station termination device 10—10''' connected to it will cause a test board meter reading (40) of zero deflection (except that a brief meter "kick" will be observed while the ringing capacitor charges if it is connected to the line during this test). Operating the reverse key (switch 42) while keeping the ground key (switch 48) closed will also produce the same effect. If no ringer is connected, it can not be determined from "0" meter reading if the line has continuity to the station protector or to the telephone jack at the subscriber location. If a short circuit occurred anywhere along the tip or ring conductors of the line, the meter reading would be somewhere between "0" and "100" and would not change when the reverse switch 42 is operated.

Figure 6:
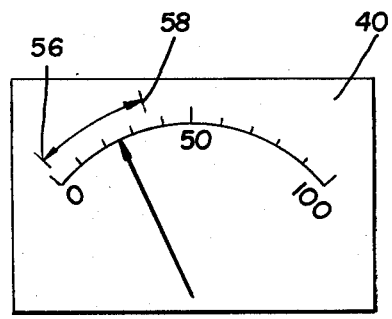
FIG. 6 is a pictorial representation of a meter face at the central office when interrogation of a subscriber line is made.

If a variable impedance line test termination device as disclosed hereinabove is installed at the subscriber location, the telephone office test desk meter 40, shown enlarged in FIG. 6, will now be "0" on a good or open line when the positive voltage is applied to the tip side of the line (terminal 44) as when switch 42 is in the right-hand position as shown in FIG. 5. By moving switch 42 to the left-hand position as shown in FIG. 5 the positive voltage from the DC test source 36 will be applied to the ring side of the line (terminal 46) and the meter will vary in accordance with the changing impedance between the limits 56 and 58 with the high current low impedance value being indicated by the limit 53 and the high impedance low current value being indicated by the limit 56. The spread or difference between the limits 56 and 58 can be increased by utilizing the embodiments disclosed in FIGS. 2, 3 or 4 which is greater than the limit obtainable from the configuration disclosed in FIG. 1.

Figure 7:
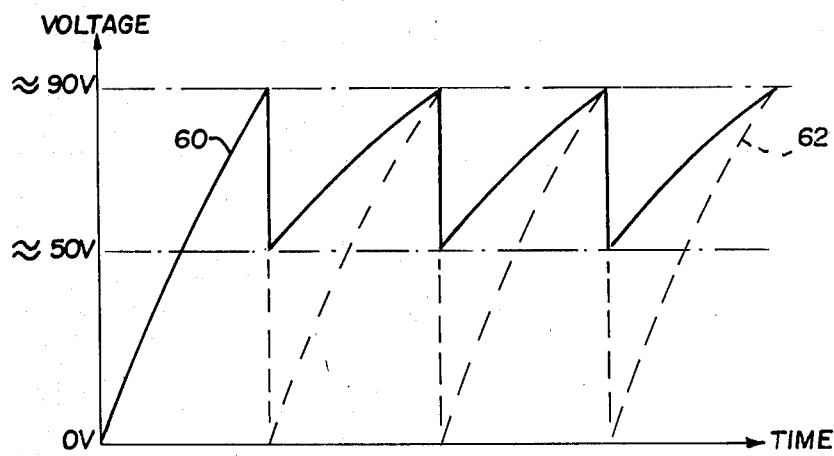
FIG. 7 is a pictorial representation of voltage versus time showing the continuous variation in voltage across a subscriber line having the instant invention affixed thereacross when it is interrogated.

As shown in FIG. 7, the voltage increases exponentially until the voltage across capacitor 18 as shown by curve 60 approaches 90 volts which is the breakover point for the voltage breakover device (e.g. neon bulb) and drops rapidly to approximately 55 volts which is the extinguishing point of the neon bulb and again rises exponentially until the breakover point. This is repeated as long as the 100 volt test voltage is applied with the proper polarity to interrogate the subscriber line. The deflection on the meter as shown in FIG. 6 is readily observable by a test desk operator and he can readily determine the subscriber line is intact and operating normally up to the location of the variable impedance line test termination device. The configurations, as shown in FIGS. 2 through 4, cause the voltage breakover device to drop to a lower voltage when breaking down, thereby lowering the voltage across terminals 12 and 14, as shown by the dotted voltage curve 62, which is repeated as long as the voltage of the proper polarity is applied to the subscriber line. The greater deviation appearing on the face of the test meter is more readily discernible by the test desk operator. This dual signature also prevents the device signature from being confused with actual line trouble. If a line has a short circuit between the tip and ring sides, the meter will read somewhere between "0" and "100" and will not be polarity sensitive giving a fixed reading in both directions.

Figure 8:
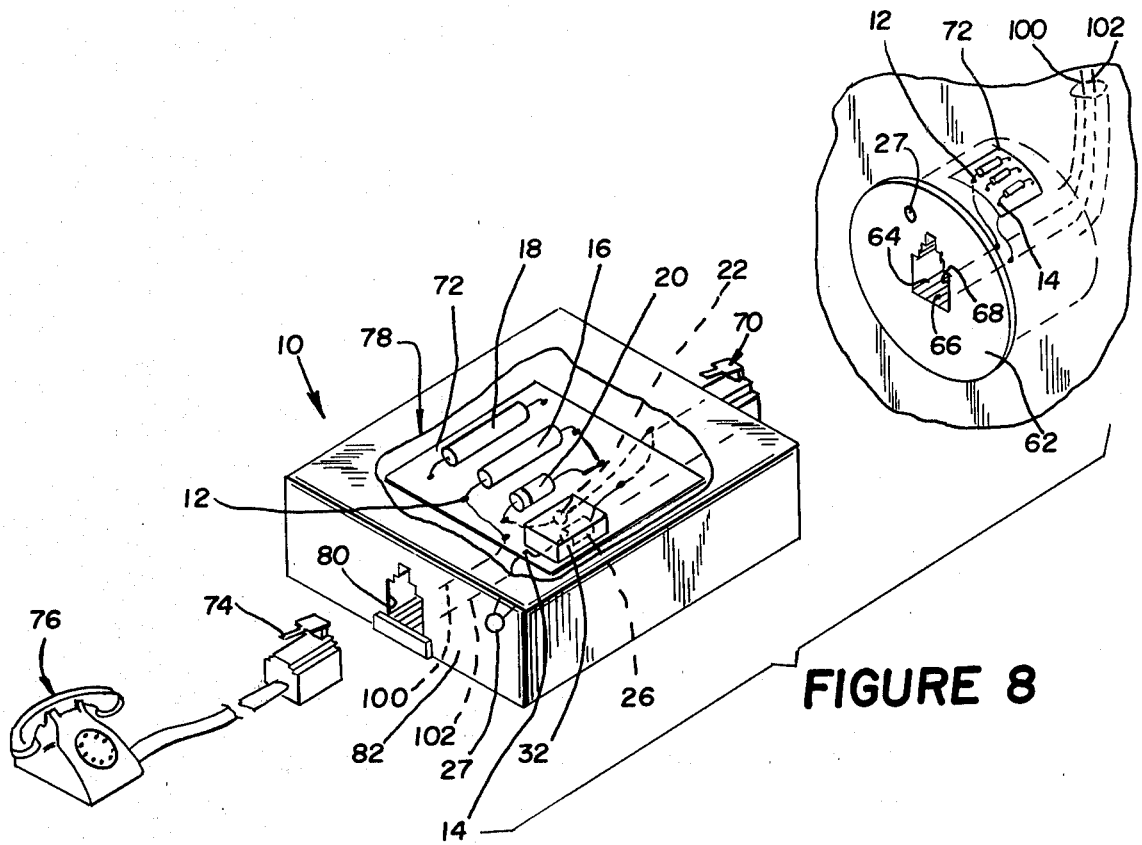
FIG. 8 is a pictorial representation not to scale, of three alternative housings for the instant invention.

FIG. 8, drawn with enlarged portions, discloses a plurality of housings for varying impedance line test termination devices 10 which are capable of providing the characteristic signature to the telephone central office, not shown, when a continuity test is made on a subscriber's telephone line generally consisting of a pair of electrically conductive wires 100 and 102, which are connected to the telephone central office. The wires 100 and 102 are terminated by the telephone company in a wall socket 62 which provides electrically conductive contacts 64 and 66 upon which wires 100 and 102 are affixed. The wall socket 62 is provided with an aperture 68 having an irregular shape which is adapted to mate with a male plug 70 that is provided with electrically conductive contacts, not shown, that cooperate with contacts 64 and 66 of receptacle 62, thereby continuing the electrically conducting path therethrough. The wires (electrically conductive paths) 100 and 102 have connected thereacross a first current path including, for example as shown in FIG. 4, a resistor 16 and a capacitor 18. A diode 20 connected in series with the voltage breakover device 22, which may be a neon tube, forms a second current path and is connected across or in parallel with capacitor 18. An additional light dependent resistor 26 is connected in parallel with the first current path consisting of resistor 16 and capacitor 18. Resistor 26 is kept in close proximity to the light emitting breakover device 22 and preferably, is in a separate sealed housing to prevent it from being affected by ambient light. As described hereinbefore, an additional light emitting device 27 and/or current meter 29 may be placed in series with the light dependent resistor 26. The light emitting device or neon bulb 27 may be placed in an area on the plug 62 such that it remains visible after plug 74 has been inserted into aperture 68, thereby, providing a visual indication when the central office interrogates the subscriber line as explained earlier. The components 16, 18, 20, 22 and 32, being connected across terminals 12 and 14 are preferably mounted on a miniature printed circuit terminal board 72 that includes terminals 12 and 14. Terminals 12 and 14 are connected across the conductive wires 100 and 102 and may be affixed there permanently. The circuit arrangement will thus provide a characteristic signature when a telephone line cord plug 74 that is normally provided on a telephone set 76 is inserted into aperture 68 or omitted therefrom.

In an alternative embodiment, the line cord plug 70 is provided in a housing 78 which has a plug 70 provided at one end and is provided with a receptacle or socket 80 adapted to receive telephone line plug 74 therein to continue the electrical conductive paths formed by wires 100 and 102 which are continued through plug 70 to the contact area of receptacle 80. The circuit arrangement, such as for example, disclosed in FIG. 4, may be included on a printed circuit board 72 and connected across conductive paths 100 and 102 in the same manner as that disclosed for socket 62. A light emitting device 27 and/or meter 29 may be mounted in the end surface 82 of housing 78 so that a visual indication may be provided when interrogation of the subscriber line up to and including, the housing 78 is made by the telephone central office. Thus, the circuit arrangement may be installed in a separate housing 78 or in a wall socket 62. Moreoever, it may be even more convenient for the telephone company to install the preferred circuit arrangement in the telephone set 76 with the indicating means either provided in the telephone itself or in its associated line cord plug 74.

Figure 9:
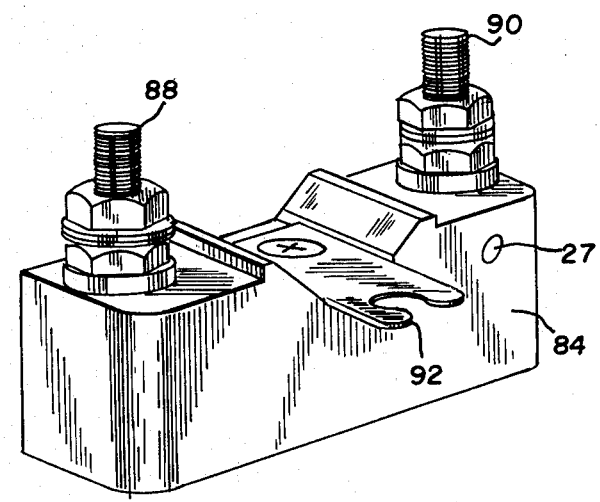
FIGS. 9 and 10 are further alternative housings for the instant invention.
Figure 10:
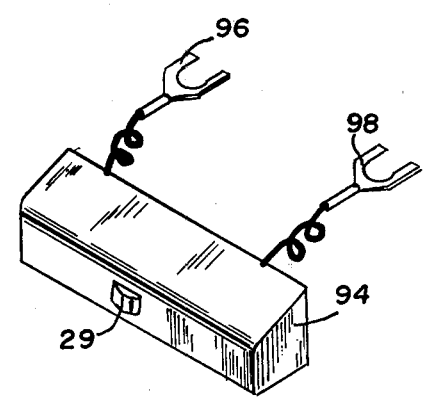

Yet another embodiment of a housing suitable for any of the circuit arrangements disclosed hereinbefore is shown in FIG. 9. Housing 84 may include a two or three-electrode gas tube arrester, a fail-short device, and a back-up air gap device not shown, known as TII-355 and TII-356 manufactured by Telecommunication Industries, Incorporated of Lindenhurst, N.Y. The housing may also include any one of the circuit arrangements described hereinbefore and preferably includes the additional visual indicating device (neon tube 27 and/or meter 29) mounted in the housing as shown in FIGS. 9 and 10. The housing shown in FIG. 9 includes terminals 88 and 90 and a ground lug 92. Terminals 88 and 90 are readily wired across the subscriber telephone lines 100 and 102 at some point where the subscriber line comes into the residence. It is suitable for both indoor and outdoor installations and may be provided in a housing, not shown, wherein a plurality of housings 84 may be conveniently installed. Of course, ground lug 92 is connected to earth ground, in a conventional manner, to provide a path for any over voltage or lightning strike. The embodiment disclosed in FIG. 10 includes a housing 94 which has extending therefrom a pair of spade lugs 96 and 98 which may be wired across the subscriber line 100 and 102 at any convenient point. Visual indication of interrogation by the central office is provided by the meter 29 (or a neon lamp) mounted on the top surface of housing 94.

Hereinbefore has been disclosed a variable impedance line test circuit arrangement and device which is inexpensive to manufacture and readily incorporated into presently existing telephone line cords, plugs and jacks. It will be understood that various changes in the details, materials, arrangement of parts and operating conditions which have been herein described and illustrated in order to explain the results of the invention may be made by those skilled in the art within the principles and scope of the present invention.

Having thus set forth the nature of the invention what is claimed is:

1. A varying impedance line test termination device for providing a characteristic signature to the telephone central office when a continuity test is made on a subscriber line having a pair of electrically conductive paths comprising:
(a) a first current path having a first resistor and a capacitor connected in series, said serially connected first resistor and capacitor being connected across said electrically conductive line paths; and
(b) a second current path having a diode and a voltage breakover device connected in series, said serially connected diode and voltage breakover device being connected across said capacitor.

2. A varying impedance line test termination device according to claim 1 further including a second resistor, said second resistor being connected across said first resistor.

3. A varying impedance line test termination device according to claim 2 wherein said second resistor is a light dependent resistor.

4. A varying impedance line test termination device according to claim 1 further including a second resistor, said second resistor being light dependent and connected in parallel with said serially connected first resistor, said diode and said voltage breakover device, said voltage breakover device being a light emitting device and disposed in close proximity to said light dependent second resistor for cooperating therewith.

5. A varying impedance line test termination device according to claim 4 further including a light emitting device connected in series with said second light dependent resistor.

6. A varying impedance line test termination device according to claim 4 further including a current meter connected in series with said second light dependent resistor.

7. A varying impedance line test termination device according to claim 1 further including a second resistor connected across said first resistor and a third resistor connected across said capacitor, said second and third resistors being light dependent resistors and disposed in close proximity to said voltage breakover device for cooperation therewith, said voltage breakover device being a light emitting device.

8. A varying impedance line test termination device according to claim 4, 5, 6 or 7 wherein said light emitting device is a neon bulb.

9. A varying impedance line test termination device according to claim 1, 2, 3, 4, 5, 6 or 7 wherein said voltage breakover device is a gas tube.

10. A varying impedance line test termination device according to claim 1, 2, 3, 4, 5, 6 or 7 wherein said voltage breakover device is a light emitting semiconductor device.

11. A varying impedance line test termination device according to claim 1, 2, 3, 4, 5, 6 or 7 further including a housing, said housing having connecting means for connecting said first current path between said pair of electrically conductive line paths.

* * * * *